No. 681,797.  
T. V. KIERNAN.  
SPECTACLE FRAME.  
(Application filed May 18, 1901.)  
Patented Sept. 3, 1901.
(No Model.)
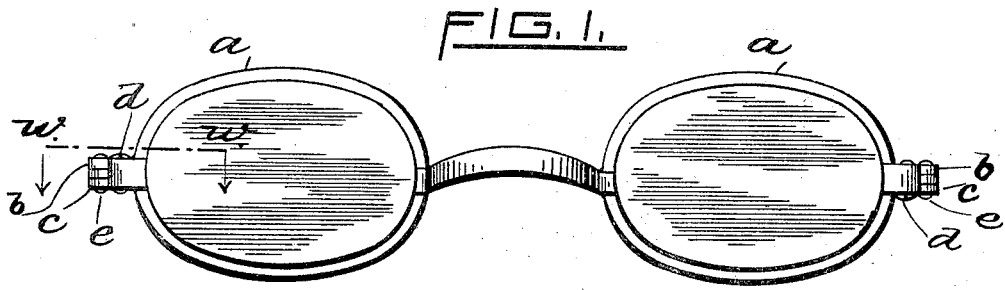
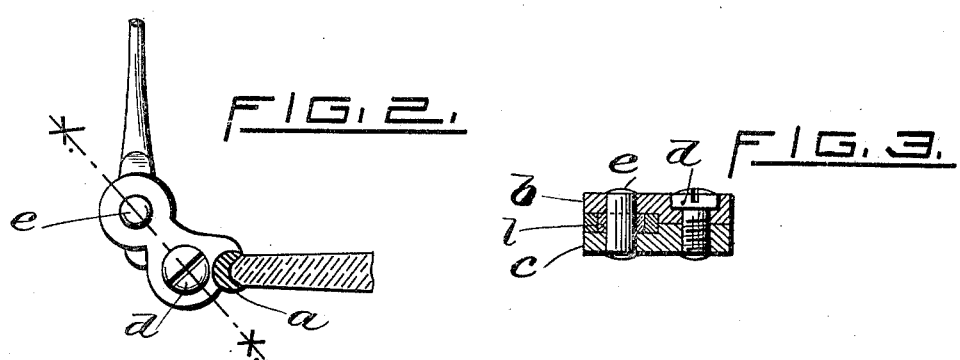
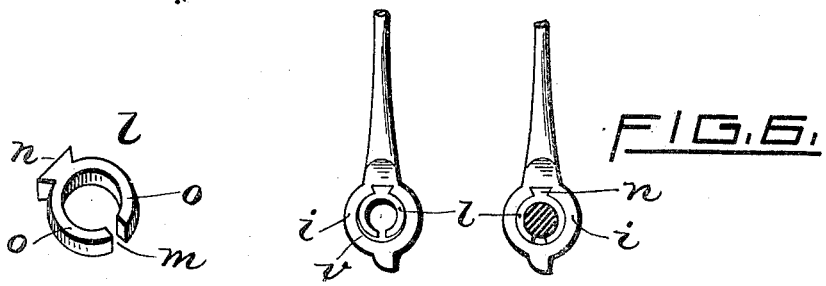
Witnesses:  
Charles T. Hannigan  
William E. Stouten
Inventor:  
Thomas V. Kiernan  
By Horatio E. Bellows  
Atty.

UNITED STATES PATENT OFFICE.

THOMAS V. KIERNAN, OF PROVIDENCE, RHODE ISLAND.

SPECTACLE-FRAME.

SPECIFICATION forming part of Letters Patent No. 681,797, dated September 3, 1901.

Application filed May 18, 1901. Serial No. 60,858. (No model.)

*To all whom it may concern:*

Be it known that I, THOMAS V. KIERNAN, a citizen of the United States, residing at Providence, in the county of Providence and State of Rhode Island, have invented a certain new and useful Improvement in Spectacle-Frames, of which the following is a specification, reference being had therein to the accompanying drawings.

My invention relates to the joints and bearings of spectacle-frames, consisting of a divided lens-frame and overlapping end pieces.

Efforts have been constantly made to provide such a bearing for the temple-bow of spectacles as to obviate the tendency of that member to collapse after a short period of usage, thus giving an appearance of dilapidation to an otherwise perfect frame.

The purpose of my invention is to obviate this defect and attain the desired end by a cheap means which will neither weaken the temple nor be limited in application to a particular form of dowel-pin, which latter results have characterized certain previous attempts to attain the end now sought.

My invention is hereinafter described in connection with the accompanying drawings, wherein like letters of reference indicate like parts throughout.

Figure 1 is a front elevation of a pair of spectacles containing my invention; Fig. 2, a plan view of one of the joints; Fig. 3, a vertical section of the latter on line $x$ $x$ of Fig. 2; Fig. 4, a detail of the bushing; Fig. 5, a detail view of the mounted bushing disengaged from the dowel-pin; and Fig. 6, a like view of the same engaged with the pin.

The construction of my invention is as follows: The lens-frames $a$ are provided with the usual upper and lower overlapping end pieces $b$ and $c$, respectively. The lens-screw $d$ traverses the end pieces and unites them detachably together. A dowel-pin $e$ of cylindrical form or a screw traverses the outer ends of the end pieces. The temple-joint $i$ is pierced at $v$ to receive a hardened spring-bushing $l$, circular in general outline, with one portion of its circumference $m$ split, forming two flexible members $o$. Another portion of the bushing has an external projection $n$. The bushing $l$ is forced into the pierced portion of the temple-joint $v$, where it is held against peripheral movement by the dovetailed projection $n$. The insertion of the dowel $e$ into position as a mounting for the temple-joint $i$ distends the inclosing projections $o$ of the bushing, as shown in Fig. 6, and furnishes a frictional bearing for the temple which will accommodate itself to any irregularities or wear of the pin and provides a joint which will neither bind nor disengage. The bushing may be made thinner than the temple-joint, if it is desired, as an additional fixing means to stamp the edges of the temple-joint to overlap the faces of the bushing.

It is obvious that a tapering dowel-pin can be used in my structure. Furthermore, this construction is not limited to split frames, but may be used in the ends commonly used in rimless spectacles.

Having thus described my invention, what I claim as new, and desire to secure by Letters Patent, is—

In a spectacle-frame, the combination with the end piece and the temple-joint piece having a socket, of a split spring-bushing fitted thereinto and having dovetailed extension fitting a correspondingly-shaped socket in the temple-joint piece and a dowel-pin embraced by said bushing and forcing the split portions thereof into frictional engagement with the walls of the bushing-socket, all substantially as shown and described.

In testimony whereof I have affixed my signature in presence of two witnesses.

THOMAS V. KIERNAN.

Witnesses:
 HORATIO E. BELLOWS,
 GEORGE H. CAHOONE.